United States Patent [19]

Nasu

[11] Patent Number: 4,573,834
[45] Date of Patent: Mar. 4, 1986

[54] PIERCER

[75] Inventor: Nobuo Nasu, Fukuyama, Japan

[73] Assignee: Kabushiki Kaisha Kawakami Seisakusho, Hiroshima, Japan

[21] Appl. No.: 687,590

[22] Filed: Dec. 31, 1984

[51] Int. Cl.[4] .............................................. B23G 1/00
[52] U.S. Cl. ...................................... 408/16; 408/75; 408/77; 408/234; 83/521
[58] Field of Search ................... 408/16, 75, 77, 78, 408/129, 124, 234; 83/520, 521, 868, 660

[56] References Cited

U.S. PATENT DOCUMENTS

| | | | |
|---|---|---|---|
| 3,656,391 | 4/1972 | Von Arx | 83/521 |
| 3,713,746 | 1/1973 | Luthy | 408/16 |
| 4,108,564 | 8/1978 | Peddinghaus et al. | 408/77 X |
| 4,503,740 | 3/1985 | Brand et al. | 83/520 X |

*Primary Examiner*—James M. Meister
*Assistant Examiner*—John L. Knoble

[57] ABSTRACT

A piercer used for the manufacture of clothing and the like comprises a frame with upper and lower parallel disposed arms. A channel plate extends uprightly from the free end of the upper arm and includes an associated guide plate or guide rail extending lengthwise thereof and a slider which is movable up and down the guide rail and fixedly carrying a rotary drill with its drill bit directed downward. A reflector is disposed below the tip of the drill bit and a lamp is disposed to direct light toward the reflector so as to be reflected thereby to project a marker to a location which is directly below the tip of the drill bit, the reflector being movable away from the path of movement of the drill bit during its upward and downward movement. An anti-deflection holder is located above the tip of the drill and is adapted to move down with the rotary drill, to remain stationary on a stack of clothes as the drill bit pierces through the stack of clothes and then move upward together with the rotary drill during the upward movement thereof.

3 Claims, 8 Drawing Figures

PIERCER

BACKGROUND OF THE INVENTION

The invention relates to a piercer which is capable of piercing positioning apertures for darts or pockets through a stack of cloths in one operation during a sewing process of clothes.

It is known to perform such operation by using an electric drill which is held by hand. However, such operation tends to form drilled holes in the upper surface of a table. A few instruments are commercially available which are designed to avoid such problem when set on a table. However, there has been no apparatus available on the market which determines a location to be apertured exactly and which automatically responds to the positioning operation to perform an up and down or elevating movement of an electric drill.

The invention has been developed to satisfy such need. Specifically, the invention provides a piercer comprising a frame including an upper and a lower frame section of given lengths and disposed in parallel and opposing relationship with a given difference in elevation therebetween, a channel plate extending upright from the free end of the upper frame section to a given height with a guide plate or guide rail extending along the length thereof, a slider movable up and down along the guide plate, a rotary drill secured to the slider with its drill bit directed downside, a reflector disposed slightly below the drill bit, the reflector effecting reflection of light from a lamp which is disposed on one side wall of the channel plate to project an optical point mark to a location which is vertically and directly below the tip of the drill bit, the reflector being disposed for movement away from its normal position during the upward or downward movement of the slider, and an anti-deflection holder plate located slightly above the tip of the drill bit, the anti-deflection holder plate moving down together with the rotary drill and remaining on an uppermost one of the cloths during the piercing operation of the drill bit through the cloths and moving upward during the upward movement of the rotary drill.

DESCRIPTION OF PREFERRED EMBODIMENT

Figure 1:
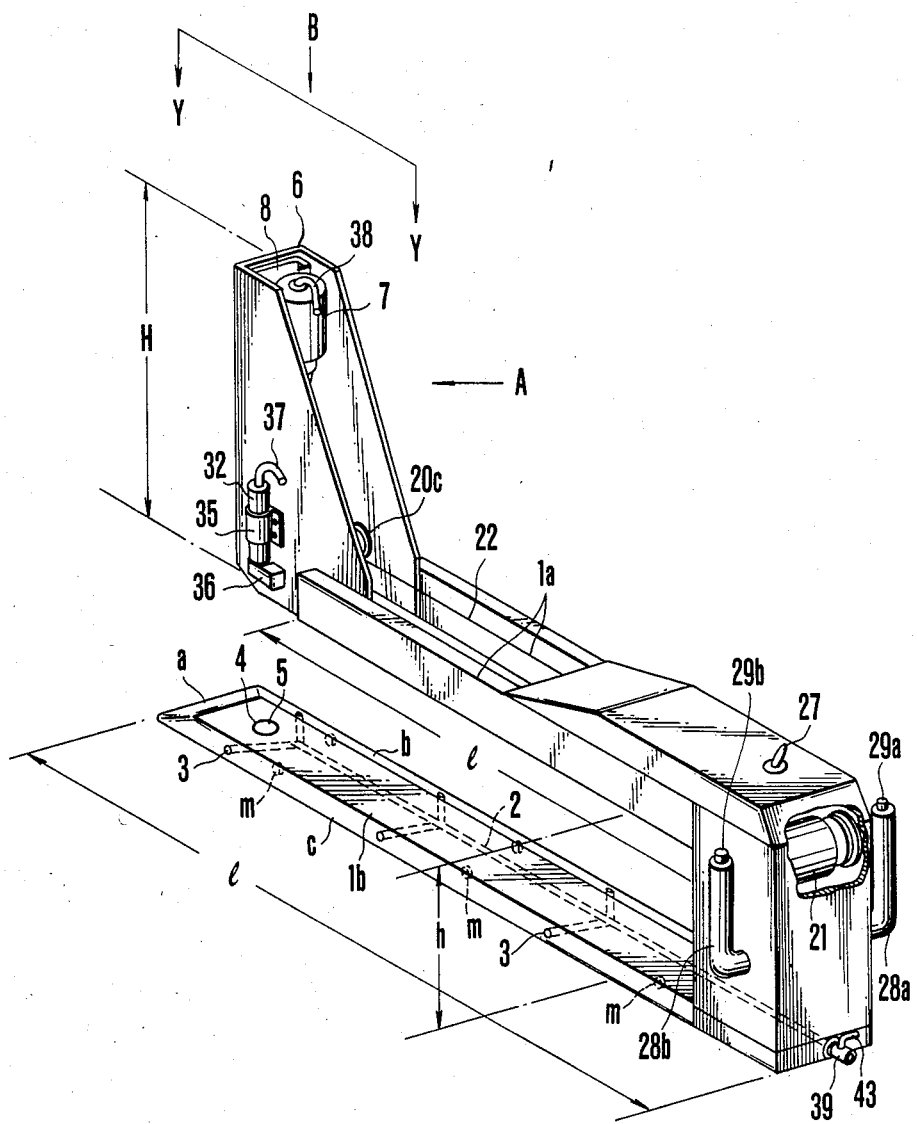
FIG. 1 is a perspective view of the overall arrangement of one embodiment of the invention.
Figure 2:
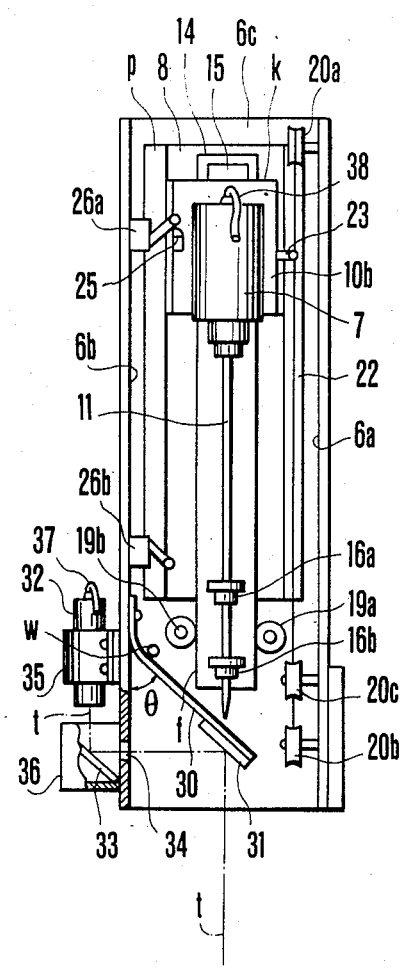
FIG. 2 is a fragmentary front view, as viewed in a direction of an arrow A shown in FIG. 1.
Figure 3:
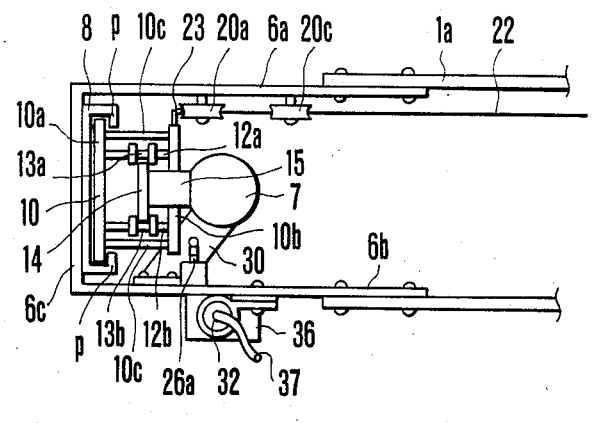
FIG. 3 is a fragmentary plan view, as viewed in a direction of an arrow B shown in FIG. 1.
Figure 4:
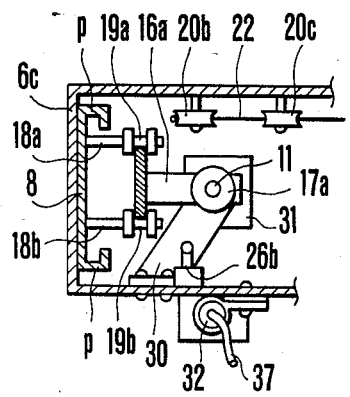
FIG. 4 is a longitudinal section taken along the line X—X shown in FIG. 1.
Figure 5:
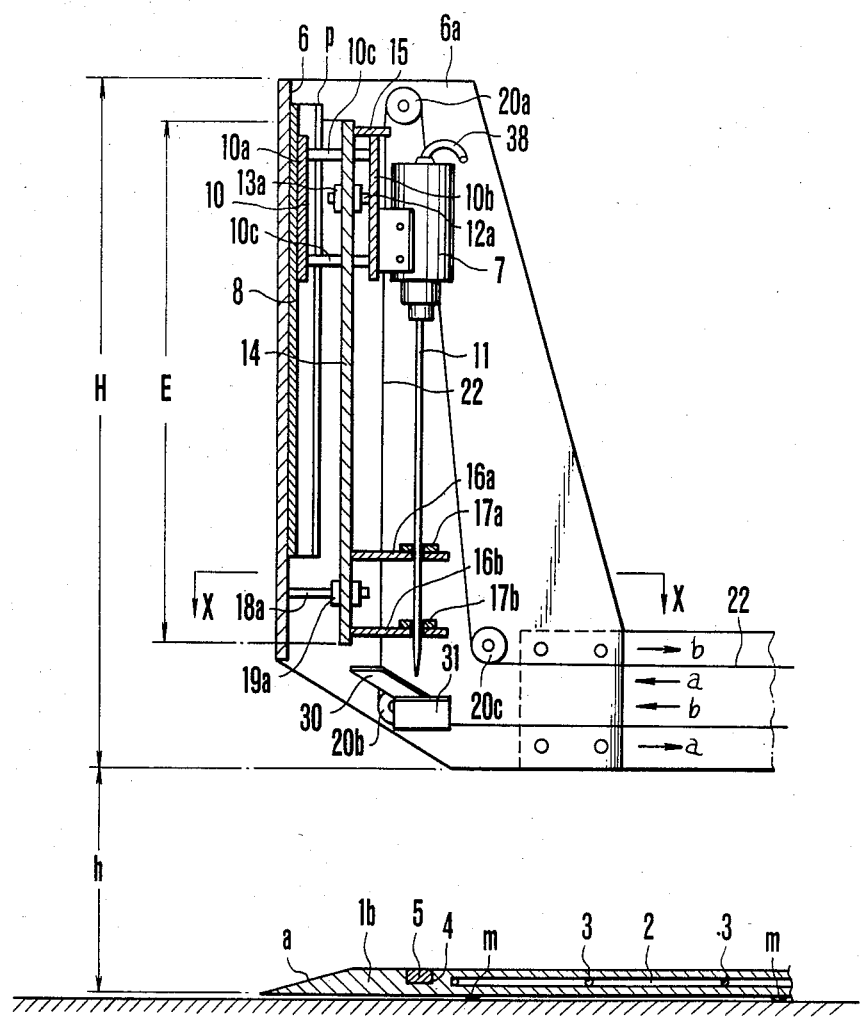
FIG. 5 is a cross section taken along the line Y—Y shown in FIG. 1.

Referring to the drawings, the apparatus of the invention includes a frame 1 which comprises an upper frame section 1a and a lower frame section 1b of given lengths l, l' and which are disposed in parallel and opposing relationship with a given spacing or difference in elevation h therebetween. The magnitude of the height h is chosen to a suitable value which permits a stack of cloths to be received between the both frame sections. The lenghts l' is chosen to be equal to at least one-half the length of a table used such as a web laying or cutting table.

The lower frame section 1b is constructed in the form of a strip having a relatively reduced wall thickness so that it may be readily inserted between the stack of cloths and the table. It has a front surface a and left and right end faces b and c, all of which are formed as gently bevelled surfaces. A plurality of rollers m are embedded in the bottom surface of the lower frame section 1b and are spaced apart along the length thereof, with the rollers partly projecting below the bottom surface. A main passage 2 extends lengthwise within the strip which defines the lower frame section 1b, and branches into a plurality of air blow-off openings 3 which are disposed in the bevelled surfaces. Adjacent to the free end, the frame section 1b is centrally proveded with a small circular opening 4 in which a rubber piece 5 having a given thickness is received so that the tip of the rotary drill may pierce into and resisted by the rubber pierce when the rotary drum moves down from the upper frame section.

A channel plate 6 extends uprightly from the free end of the upper frame section 1a to a given height H, and internally receives a motored rotary drill 7 for vertical movement up and down therein. Specifically, the channel plate includes a base wall 6c which is integrally provided with a guide plate 8 extending along the length of the wall 6c and having a pair of lateral ends in which key-shaped grooves p are formed. A slider 10 has the rotary drill mounted thereon and is slidable along the guide plate 8.

The slider 10 comprises a bottom plate 10a which is slidable along the guide plate 8, a top plate 10b which is forwardly spaced at a given distance from the bottom plate 10a and on which a mount for the rotary drill 7 is secured, and a set of four connecting rods 10c which connect across these plates at the four corners thereof for connecting them together. The rotary drill 7 is mounted on the front surface of the top plate 10b in a manner such that a drill bit 11 has its tip directed downward. Mounted on the rear surface of the top plate 10b at locations which are offset inside from the connecting rod 10c are a pair of horizontally extending rods 12a, 12b of a length which is equal to or less than one-half the length of the connecting rods 10c and which rotatably carry grooved rollers 13a, 13b on their free end. A guide plate 14 for the tip of the drill bit 11 slidably passes between the rollers 13a, 13b.

Specifically, the guide plate 14 has a width which is chosen such that the plate can be guided between the rollers 13a, 13b, and has a height E which is slightly less than the height H of the channel plate 6. On its top, the guide plate 14 is provided with a key segment 15 which is adapted to engaged the top plate 10b to prevent the free fall thereof. Adjacent to its bottom end, the guide plate 14 is provided with a pair of vertically spaced arms 16a, 16b on which needle guides 17a, 17b are provided, through which the drill bit 11 passes, thus preventing the deflection of the free end portion of the drill bit 11 during the operation of the rotary drill, as will be described later. In the example shown, means to prevent the deflection are provided at two locations, but a single location may be chosen. A pair of support rods 18a, 18b extend from the base 6c of the channel plate 6 adjacent to the lower end of the guide plate 14, and rotatably carry a pair of grooved rollers 19a, 19b on their free end which function in the similar manner as the rollers 13a, 13b to assure a smooth sliding movement of the guide plate 14.

In this embodiment, the elevating motion of the rotary drill 7 takes place in the following manner: Thus, the channel plate 6 has a limb wall, which is 6a in the example shown, on which a plurality of guide rollers 20a, 20b, 20c are rotatably mounted at spaced points therealong, and a wire 22 extends around these rollers, and is driven by a motor 21 which is internally housed within the frame 1. The top plate 10b which fixedly carries the rotary drill 7 is secured to the wire 22 by means of a fastener 23 so that during the rotation of the motor 21 in either forward or reverse direction, the wire 22 moves in opposite directions to cause the rotary drill 7 to be lowered or elevated. A switching between the upward and the downward movement is achieved by a dog 25 which is attached to the side of the mount for the rotary drill and which moves into or out of contact with a pair of limit switches 26a, 26b mounted on the other limb wall 6b of the channel plate 6 at vertically spaced points. More specifically, the frame 1 is provided with a main switch 27, and is also provided with a pair of handles 28a, 28b which are attached to the both lateral walls of the frame. When the main switch 27 is turned on and one of switch buttons 29a, 29b which are disposed in the top of each handle, (in the example shown, switch button 29a being chosen) is depressed, the motor 21 is energized for forward rotation, whereby the wire 22 moves in a direction indicated by an arrow a, carrying the top plate 10b in the same direction for downward movement. In the course of such downward movement, the dog 25 mounted thereon engages the limit switch 26b, which then reverses the energization of the motor 21, thus causing the wire 22 to move in the opposite direction or in a direction indicated by an arrow b thus causing the top plate 10b to be immediately turned into upward movement. When the dog 25 engages the limit switch 26a, the energization of the motor 21 is again reversed for forward rotation, but the motor 21 is then deenergized and remains stationary temporarily until the switch button 29a is depressed again. The switch button 29b is provided to achieve a temporary stop in the course of the elevating motion.

Mounted on the limb wall 6b of the channel plate 6 which is opposite to the limb wall on which the rollers 20a to 20c for turning the wire 22 are mounted is a leaf spring 30 toward its lower end, and a reflector plate 31 is attached to the leaf spring 30. The purpose of the reflector plate 31 is to project light as a point mark in the form of letter O or X on a cloth surface, the mark being indicative of the location of the tip of the drill bit 11. At this end, the reflector plate is disposed at an angle of $\theta = 45°$ at a point slightly below and vertically aligned with the tip of the drill bit 11. A slight source comprises a lamp 32 which is mounted on the outside of the limb wall 6b, and light t from the lamp is reflected by a reflector plate 33 which is similarly disposed at an angle of 45° and thus is reflected 90° for incidence onto the reflector 31 through an aperture 34 formed in the wall 6b. It will be noted that the lamp 32 is mounted on the wall 6b by means of a bracket 35 and the reflector plate 33 is mounted on the same wall by another bracket 36. A pair of supply cords 37, 38 are connected to the lamp 32 and the rotary drill 11, respectively, whereby when the main switch 27 on the frame 1 is turned on, the lamp 32 is illuminated and the rotary drill 7 is simultaneously set in motion. An air duct inlet 39 is formed in the lower frame section 1b and communicates with the main passage 2.

Figure 7:
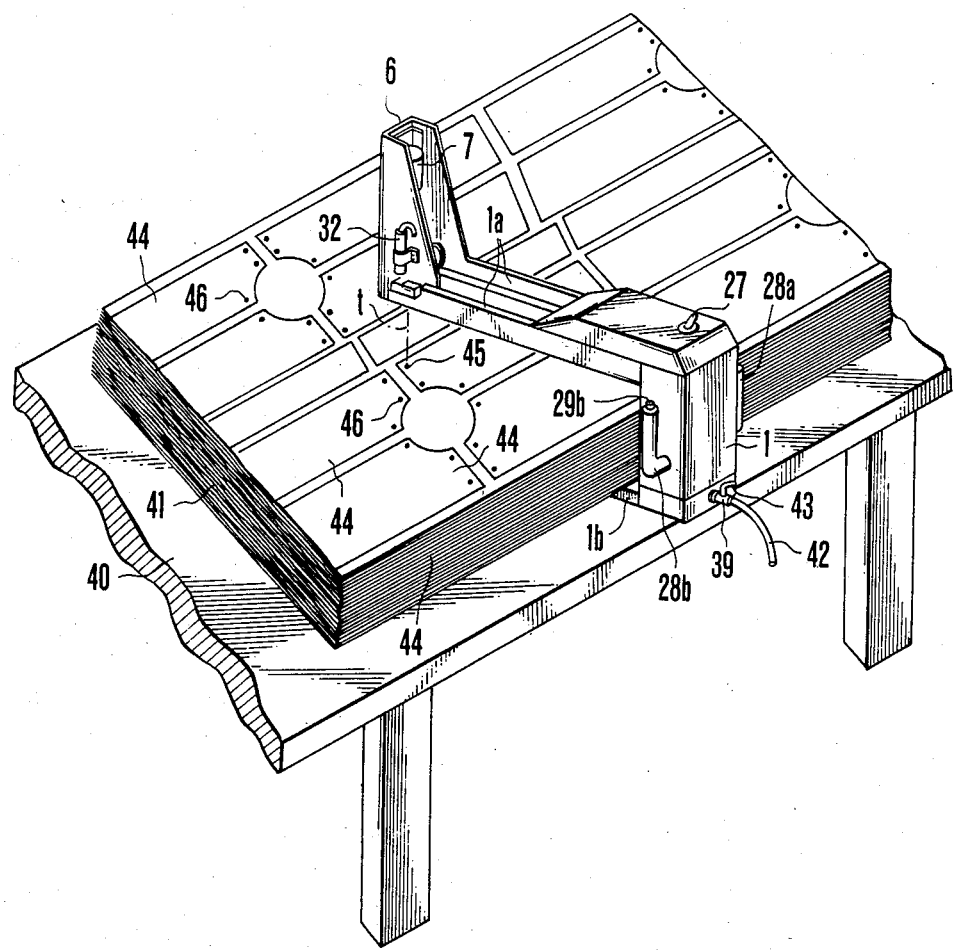
FIG. 7 shows the apparatus in its use.

In use, a stack of cloths 41 is placed on top of a table 40, and a lower frame section 1b is inserted between the stack and the table, as illustrated in FIG. 7. Such insertion can be performed by holding the handles 28a, 28b by hand. An air hose 42 extending from an air compressor, not shown, is connected to the air duct inlet 39, and a cock 43 is opened so that the air may be blown off through the openings 3 formed in the lower frame section 1b, thus allowing the insertion to be achieved in a very smooth manner. The use of the blowing air is advantageous when the stack has an increased number of cloths 41.

Figures 6A, 6B:
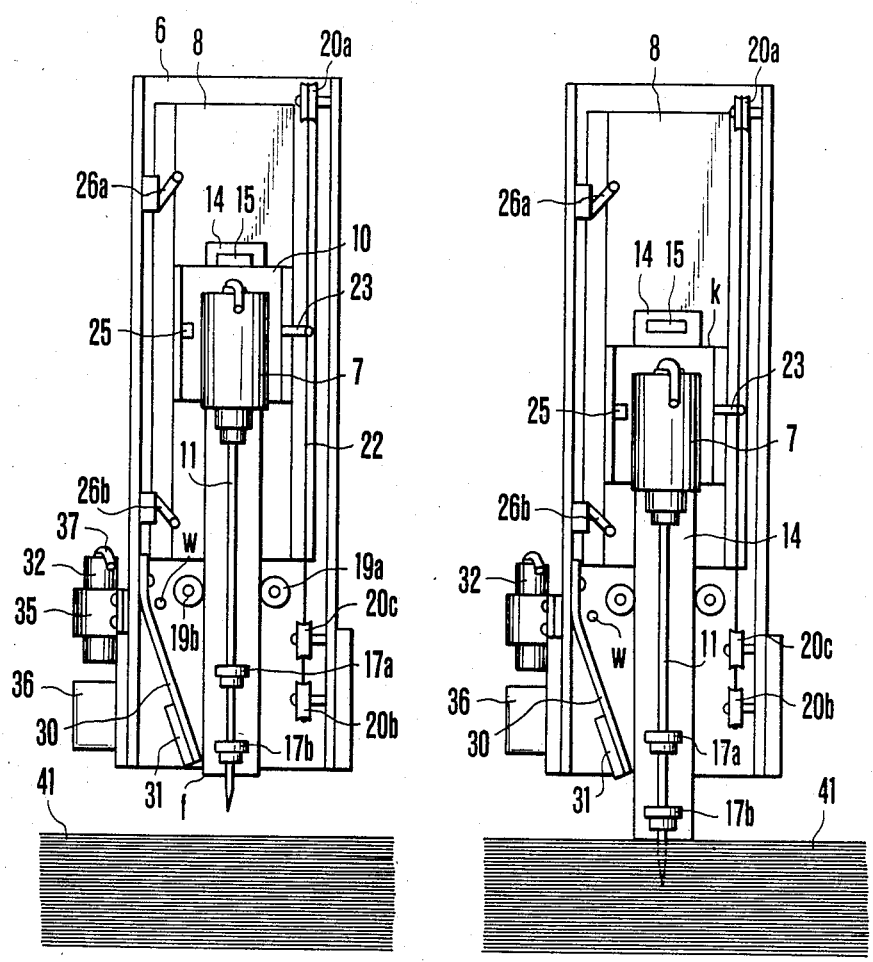
FIG. 6A and B are similar views to FIG. 2, illustrating the operation of the apparatus of the invention when the rotary drum moves down.

Normally, a paper pattern 44 having indications of points to be pierced or lines to be cut along is placed on top of cloth 41. When the main switch 27 is initially turned on, the rotary drill 7 beings to rotate and lamp 32 is illuminated, whereby a point mark 45 in the form of letter O or X and which is aligned with the location of the tip of the drill bit 11 is projected onto the paper pattern 44. Accordingly, when the point mark 45 moves into alignment with one of piercing marks 46 impressed on the paper pattern 44, the switch button 29a on the handle 28a may be depressed. This energizes the motor 21, and the wire 22 initially moves in the direction of the arrow a, whereby the slider 10 having the rotary drill 7 mounted thereon moves down as guided along the guide plate 8. At this time, as illustrated in FIG. 6A, one side f of the guide plate 14 moves into contact with the leaf spring 30, whereby the reflector plate 31 is driven out of path of the tip of the drill bit. During the downward movement, the guide plate 14 which carries the tip of the drill bit 11 also moves down by gravity to prevent the deflection of the drill bit 11 so that latter may be brought to the location of the aperture mark 46 on the paper pattern 44. Subsequently, the guide plate 14 remains stationary on the paper pattern 44 while only the drill bit 11 moves down, as illustrated in FIG. 6B, with the tip of the drill bit 11 piercing through the cloths 41. When a position is reached where the tip of the drill bit 11 engages the rubber piece 5 on the lower frame section 1b, the top plate 10b contacts the limit switch 26b, whereupon the energization of the motor 21 is reversed, causing the wire 22 to be turned in the opposite direction or in the direction of the arrow b to lift the top plate 10b together with the rotary drill 7. The drill bit 11 becomes disengaged from the stack of cloths 41. In the course of such upward movement, the upper end k of the top plate 10b engages the key plate 15 on the guide plate 14 to carry it therewith. When the top plate 10b contacts the limit switch 26a, the energization of the motor 21 is reversed again for forward rotation before it is deenergized. The reflector plate 31 which has been driven away from the path of the drill bit now returns to its original location directly below the drill bit. It will be noted that a stop pin w is provided to retain the leaf spring 30 at its given angular position ($\theta = 45°$) as it resiliently bounces.

This completes a single piercing operation through the paper pattern 44, and the reflector plate 31 has returned to its original position directly below the tip of the drill bit 11. The handles 28a, 28b may then be held by hand to move the piercer to another piercing position on the paper pattern 44. The switch button 29a may then be depressed in the similar manner as before, thus repeating a required pirecing operation through the stack of cloths 41.

In the described embodiment, the rotation of the rotary drill 7 is initiated simultaneously as the lamp 32 is illuminated in response to turn-on of the main switch 27. However, the rotation of the rotary drill 7 may be intiated in the course of the downward movement thereof which occurs in response to a drive from the motor 21. Alternatively, the speed of rotation can be sequentially changed.

It will be appreciated from the foregoing description that the point mark in the form of O or X is produced as a spot of light from the lamp 32 which is aligned with the drill bit. Accordingly, such point mark may be brought into alignment with a desired piercing position on the stack of cloths, and the positioning is therefore greatly facilitated. Thus, the piercing operation can be effected rapidly and accurately. It will be recognized that the drill bit is relatively long in design, and may be otherwise instabilized during an actual piercing operation to produce an angluar deflection. However, in accordance with the invention, a guide plate in used to maintain it in a stable position, thus assuring an accurate piercing operation throughout. It will also be noted that every operation is achieved by button operation alongside the table, thus substantially improving the operational efficiency.

While the invention has been shown and described above in terms of a preferred embodiment thereof, it should be understood that a number of changes, modifications and substitutions will readily occur to one skilled in the art from the above disclosure without departing from the spirit and scope of the invention defined by the appended claims.

What is claimed is:

1. A piercer comprising a frame including an upper frame section and a lower frame section of given lengths and which are disposed in parallel opposing relationship with a given difference in elevation therebetween, a channel plate extending uprightly from the free end of the upper frame section to a given height and including an associated guide plate or guide rail extending lengthwise thereof, a slider disposed to be movable up and down along the guide plate or the guide rail and fixedly carrying a rotary drill with its drill bit directed downward, a reflector disposed slightly below the tip of the drill bit, a lamp disposed in a wall of the channel plate for directing light toward the reflector so as to be reflected thereby to project a point mark of light to a location which is vertically and directly below the tip of the drill bit, the reflector being disposed to be movable away from the path of movement of the drill bit during the upward and downward movement of the slider, and an anti-deflection holder for the drill bit which is located slightly above the location of the tip of the drill bit, the anti-deflection holder being adapted to move down together with the rotary drill, to remain stationary on a stack of cloths as the drill bit pierces through the stack of cloths and then moves upward together with the rotary drill during the upward movement thereof.

2. A piercer according to claim 1 in which a rubber piece is embedded in the lower frame section adjacent to the free end thereof for allowing the tip of the drill bit to pierce thereinto, the front end face as well as the both lateral surfaces of the lower frame section being formed as bevelled surfaces, an air passage being formed within and extending lengthwise of the lower frame section and communicating with air blow-off openings disposed at suitable locations in the bevelled surfaces.

3. A piercer according to claim 1 in which the slider is connected to a wire which is disposed to be driven by a motor which is internally housed within the frame, the channel plate carrying limit switches which are vertically spaced apart, the slider being capable of contacting a selected one of limit switches to selectively energize the motor to change the direction of rotation thereof, thus allowing the upward and the downward movement of the slider.

* * * * *